(12) United States Patent
Yang

(10) Patent No.: US 10,536,005 B2
(45) Date of Patent: Jan. 14, 2020

(54) POWER SUPPLY CONTROL APPARATUS

(71) Applicant: FUJITSU TEN LIMITED, Kobe-shi, Hyogo (JP)

(72) Inventor: Jianhuang Yang, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 292 days.

(21) Appl. No.: 15/611,086

(22) Filed: Jun. 1, 2017

(65) Prior Publication Data
US 2018/0041048 A1 Feb. 8, 2018

(30) Foreign Application Priority Data

Aug. 2, 2016 (JP) ................. 2016-152236

(51) Int. Cl.
| | |
|---|---|
| *H02J 7/00* | (2006.01) |
| *B60W 20/00* | (2016.01) |
| *B60W 20/11* | (2016.01) |
| *B60W 10/08* | (2006.01) |
| *B60W 10/06* | (2006.01) |
| *H02J 7/14* | (2006.01) |
| *B60R 16/03* | (2006.01) |
| *B60R 16/033* | (2006.01) |
| *F02D 41/06* | (2006.01) |
| *F02D 41/26* | (2006.01) |

(Continued)

(52) U.S. Cl.
CPC ............ *H02J 7/0013* (2013.01); *B60R 16/03* (2013.01); *B60R 16/033* (2013.01); *B60W 10/06* (2013.01); *B60W 10/08* (2013.01); *B60W 20/00* (2013.01); *B60W 20/11* (2016.01); *F02D 41/065* (2013.01); *F02D 41/26* (2013.01); *F02N 11/0866* (2013.01); *H02J 7/1423* (2013.01); *B60W 2510/244* (2013.01); *F02N 11/006* (2013.01); *F02N 11/04* (2013.01); *F02N 11/087* (2013.01); *F02N 2011/0888* (2013.01); *H02J 7/1492* (2013.01); *Y02T 10/7011* (2013.01); *Y02T 10/7016* (2013.01)

(58) Field of Classification Search
CPC .................................................... H02J 7/0013
USPC ......................................................... 307/10.1
See application file for complete search history.

(56) References Cited

U.S. PATENT DOCUMENTS

| | | | |
|---|---|---|---|
| 6,255,008 B1 * | 7/2001 | Iwase .................... | B60L 58/30 |
| | | | 429/9 |
| 2003/0160510 A1 * | 8/2003 | Mizutani ............ | F02N 11/0814 |
| | | | 307/10.1 |

(Continued)

FOREIGN PATENT DOCUMENTS

| | | |
|---|---|---|
| JP | 2006-336628 A | 12/2006 |
| JP | 2015-063214 A | 4/2015 |
| JP | 2015-217757 A | 12/2015 |

*Primary Examiner* — Adi Amrany
(74) *Attorney, Agent, or Firm* — Oliff PLC

(57) ABSTRACT

A power supply control apparatus controls supply of power to an accessory device connected to a first battery. The power supply control apparatus includes a power supply controller that switches a power supply state from a first state to a second state. In the first state, power is supplied to the accessory device via a power converter from a second battery that has a charge/discharge efficiency higher than the first battery. In the second state, the power is supplied from the second battery to the accessory device not via the power converter with the first battery disconnected from the accessory device.

12 Claims, 11 Drawing Sheets

(51) Int. Cl.
*F02N 11/08* (2006.01)
*F02N 11/00* (2006.01)
*F02N 11/04* (2006.01)

(56) References Cited

U.S. PATENT DOCUMENTS

| | | | | |
|---|---|---|---|---|
| 2006/0097577 A1* | 5/2006 | Kato | ................... | F02N 11/0866 |
| | | | | 307/10.1 |
| 2007/0032915 A1* | 2/2007 | Yamaguchi | ............ | H02J 7/1423 |
| | | | | 701/1 |
| 2013/0026828 A1* | 1/2013 | Iwami | ................. | H01M 10/482 |
| | | | | 307/10.1 |
| 2013/0264875 A1* | 10/2013 | Kaminsky | ................ | H01G 9/28 |
| | | | | 307/52 |
| 2015/0202983 A1* | 7/2015 | Le | ....................... | H01M 10/441 |
| | | | | 320/109 |
| 2016/0016483 A1* | 1/2016 | Yasunori | ............... | H01M 10/44 |
| | | | | 320/162 |
| 2016/0137092 A1* | 5/2016 | Thieme | ............... | B60L 11/1861 |
| | | | | 307/10.6 |
| 2018/0261890 A1* | 9/2018 | Yan | ......................... | B60L 58/14 |

* cited by examiner

| STATE OF VEHICLE | | 1ST START | STEADY TRAVELLING | | | DECELERATION REGENERATIVE BRAKING | | | MOTOR ASSISTANCE | | IS | RESTART |
|---|---|---|---|---|---|---|---|---|---|---|---|---|
| ENGINE | | START | WORKING | | | | | | | | STOP | START |
| CHARGE AMOUNT OF 2ND BATTERY | | – | LARGE | SMALL | SMALL | SMALL | SMALL | LARGE | SMALL | LARGE | – | – |
| RELAY | 1ST | ON | OFF | ON | OFF | OFF | ON | ON | ON | OFF | OFF |
| | 2ND | OFF | ON | OFF | ON | OFF | OFF | OFF | OFF | ON | ON |
| | 3RD | ON | OFF | ON | ON | ON | OFF | OFF | OFF | ON | ON |
| | 4TH | OFF | ON | OFF | OFF | OFF | DIS-CHARGE | ON | ON | OFF | OFF |
| CONVERTER | | STOP | STOP | DIS-CHARGE | STOP | STOP | DIS-CHARGE | STOP | DIS-CHARGE | STOP | STOP |

FIG. 4

POWER SUPPLY CONTROL APPARATUS

BACKGROUND OF THE INVENTION

Field of the Invention

The invention relates to a technology that controls power supply.

Description of the Background Art

Conventionally, a controller has caused power to be supplied to an accessory device from a first battery and a second battery. The first battery is directly connected to the accessory device mounted on a vehicle. The second battery has a charge/discharge efficiency higher than the first battery, and is connected to the accessory device via a power converter. For example, Japanese Patent Application Laid-open Publication No. 2015-217757 discloses a control apparatus that supplies power to an accessory device from a lead-acid battery and from a lithium-ion battery having a charge/discharge efficiency higher than the lead-acid battery, via a DC-DC converter.

However, in a case where the accessory device is supplied with power from the first battery directly connected to the accessory device and from the second battery connected to the accessory device via the power converter, if power consumption of the accessory device exceeds a maximum output power that the power converter can output, the power supply from the first battery to the accessory device increases. Thus, amounts charged and discharged to/from the first battery increase. Thus, there is a case where the first battery increasingly deteriorates from the increase in the charged/discharged amounts.

SUMMARY OF THE INVENTION

According to one aspect of the invention, a power supply control apparatus controls supply of power to an accessory device connected to a first battery. The power supply control apparatus includes a power supply controller that switches a power supply state from a first state to a second state, the first state being a state in which power is supplied to the accessory device via a power converter from a second battery that has a charge/discharge efficiency higher than the first battery, the second state being a state in which the power is supplied from the second battery to the accessory device not via the power converter, with the first battery disconnected from the accessory device.

Thus, deterioration of the battery can be curbed.

According to another aspect of the invention, the power supply control apparatus includes a processor that determines whether or not a predetermined condition is satisfied while the power supply state is in the first state. In a case where an engine of a vehicle on which the accessory device is mounted is in an idle stop state, the processor determines that the predetermined condition is satisfied. In a case where the processor has determined that the predetermined condition is satisfied while the power supply state is in the first state, the power supply controller switches the power supply state from the first state to the second state.

Thus, deterioration of the battery can be curbed.

Therefore, an object of the invention is to provide a power supply control technology that can curb deterioration of a battery.

These and other objects, features, aspects and advantages of the invention will become more apparent from the following detailed description of the invention when taken in conjunction with the accompanying drawings.

BRIEF DESCRIPTION OF THE DRAWINGS

FIG. 4 illustrates an example of power supply control information of the embodiment;

DESCRIPTION OF THE EMBODIMENTS

Figure 1A:
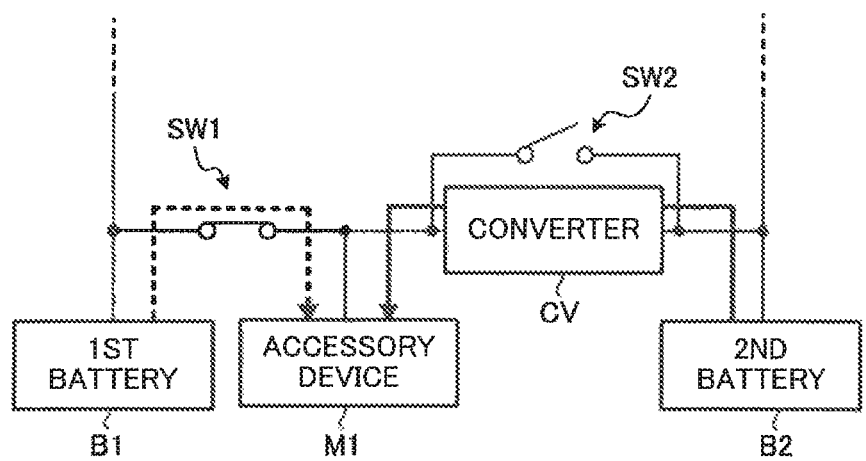
FIG. 1A illustrates a state of power supply to an accessory device implemented by a power supply control apparatus of an embodiment.
Figure 1B:
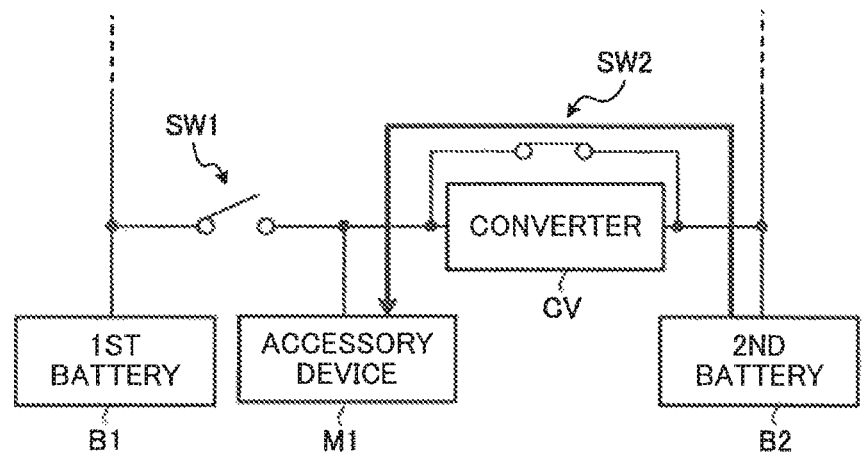
FIG. 1B illustrates a state of the power supply to the accessory device implemented by the power supply control apparatus of the embodiment.

A power supply control apparatus and a power supply control system of this embodiment will be described below with reference to the attached drawings. This embodiment does not limit the invention. FIGS. 1A and 1B illustrate states of power supply to an accessory device implemented by the power supply control apparatus of the embodiment.

First described below will be power supply control performed by the power supply control apparatus of this embodiment in a case where power is supplied to an accessory device M1 from two power sources, a first battery B1 and a second battery B2. The second battery B2 has a charge/discharge efficiency higher than the first battery B1. As shown in FIGS. 1A and 1B, the power supply control apparatus of this embodiment includes a first relay SW1 and a second relay SW2. The first relay SW1 is connected between the first battery B1 and the accessory device M1 in series.

The second relay SW2 is connected in parallel to a power converter (hereinafter "converter CV") connected in series between the accessory device M1 and the second battery B2. The converter CV is a bidirectional power converter that can charge and discharge the second battery B2. The converter CV is set such that an output voltage thereof at a time of discharge is higher than an output voltage of the first battery B1. The first battery B1 and the second battery B2 are connected to a power generator, not illustrated, and are charged properly by the power generator when those batteries B1 and B2 discharge.

As shown in FIG. 1A, the power supply control apparatus causes the first relay SW1 to be in a closed state and the second relay SW2 to be in an open state in a situation. Thus, the first battery B1 and the accessory device M1 are directly connected, and the second battery B2 and the accessory device M1 are connected via the converter CV.

Thus, the power supply control apparatus sets a first power supply state (hereinafter "first state") in which the power is supplied to the accessory device M1 via the converter CV from the second battery B2 having the charge/discharge efficiency higher than the first battery B1 connected to the accessory device M1.

At this time, the output voltage of the converter CV is higher than the output voltage of the first battery B1, as described above. Thus, the power supply control apparatus can activate the accessory device M1 with the power supplied from the second battery B2 as shown by a thick arrow line in FIG. 1A if power consumption of the accessory device M1 is equal to or smaller than the maximum output power of the converter CV. Thus, since no power is supplied to the accessory device M1 from the first battery B1, the power supply control apparatus can curb deterioration of the first battery B1 from excessive power charge/discharge.

However, in a case where the power consumption of the accessory device M1 exceeds the maximum output power of the converter CV, the power is supplied to the accessory device M1 as shown by a thick broken arrow line in FIG. 1A. If this state continues, the first battery B1 is increasingly deteriorated from excessive power charge/discharge.

The power supply control apparatus causes the first relay SW1 to be in the open state and the second relay SW2 to be in the closed state, as shown in FIG. 1B, from the first state, depending on a situation. Thus, the power supply control apparatus disconnects the first battery B1 from the accessory device M1 to change the power supply state from the first state to a second power supply state (hereinafter "second state") in which the power is directly supplied to the accessory device M1 from the second battery B2, not via the converter CV.

As described above, since the power supply control apparatus disconnects the first battery B1 from the accessory device M1 so that blocks the power supply from the first battery B1 to the accessory device M1, the power supply control apparatus can curb deterioration of the first battery B1 from excessive power charge/discharge.

Moreover, in a case where the second battery B2 stores power enough to drive the accessory device M1, the power supply control apparatus can drive the accessory device M1 by directly supplying the power to the accessory device M1 from the second battery B2, not using the converter CV, as shown by a thick arrow line in FIG. 1B.

Further, the second battery B2 has the charge/discharge efficiency higher than the first battery B1. Thus, even in a case where the second battery B2 does not store power enough to drive the accessory device M1, if the second battery B2 is being charged, the power supply control apparatus can drive the accessory device M1 by directly outputting, to the accessory device M1, the power input to the second battery B2.

Figure 2:
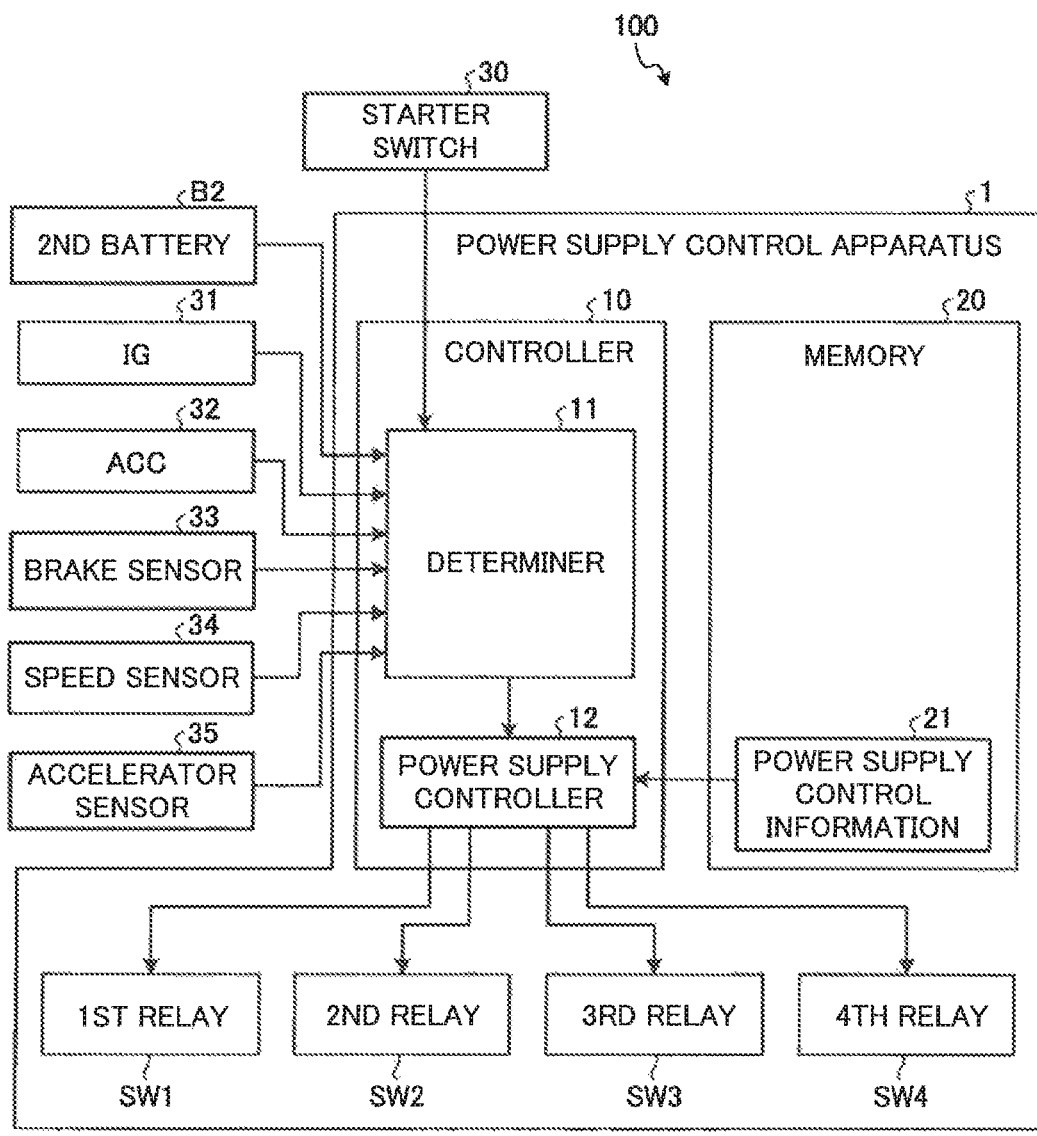
FIG. 2 is a block diagram showing a power supply control system of the embodiment.

Next, a configuration of a power supply control system 100 of this embodiment will be described with reference to FIG. 2. FIG. 2 is a block diagram showing the power supply control system 100 of this embodiment. In FIG. 2, elements same as the elements shown in FIGS. 1A and 1B are given with same reference numerals in FIGS. 1A and 1B.

A case will be described in which an object that is controlled by the power supply control system 100 is a vehicle. However, an object to be controlled by the power supply control system 100 may be a train, a ship, a boat and an airplane, etc. Moreover, the case that will be described is an example. In the case, a vehicle on which the power supply control system 100 is mounted (hereinafter simply "vehicle") includes an engine and a motor that assists an engine motion. The vehicle may be a so-called hybrid car that can travel by the engine, the motor or cooperation of the engine and the motor.

As shown in FIG. 2, the power supply control system 100 includes a power supply control apparatus 1 and the second battery B2. The power supply control apparatus 1 is connected to the second battery B2, a starter switch 30, an ignition switch (hereinafter "IG 31"), an accessory power switch (hereinafter "ACC 32"), a brake sensor 33, a speed sensor 34 and an accelerator sensor 35.

In addition to the elements shown in FIG. 2, the vehicle includes other elements relating to the power supply control, such as the first battery B1, the accessory device M1 and the converter CV shown in FIGS. 1A and 1B. Connection manners of those elements to the power supply control system 100 will be described later with reference to FIG. 3.

The starter switch 30 switches between whether or not driving power to start the engine is supplied to a starter M3 (refer to FIG. 3) that drives the engine of the vehicle, later described. The starter switch 30 outputs, to the power supply control apparatus 1, information indicative of whether or not the driving power is being supplied to the starter M3. The IG 31 is for manually switching between start and stop of the engine of the vehicle on which the power supply control system 100 is mounted. The IG 31 outputs, to the power supply control apparatus 1, information indicative of whether or not the engine is in a starting state.

The ACC 32 is for manually switching between turning-on and turning-off of vehicle-mounted accessories, such as the accessory device M1, in accordance with, for example, an operation with the IG 31. The ACC 32 starts sending electricity to the accessories in accordance with an engine start operation made with the IG 31, and stops sending the electricity to the accessories in accordance with an engine stop operation made with the IG 31. Then, the ACC 32 outputs, to the power supply control apparatus 1, information indicative of whether or not the electricity is being sent to those accessories.

The brake sensor 33 detects an operating state of a control apparatus that slows and stops the vehicle, and outputs a detection result to the power supply control apparatus 1. The speed sensor 34 detects a travelling speed of the vehicle, and outputs a detection result to the power supply control apparatus 1. The accelerator sensor 35 detects a state of an operation with an accelerator pedal of the vehicle, and outputs a detection result to the power supply control apparatus 1. Specific examples of the second battery B2 will be described later.

Figure 3:
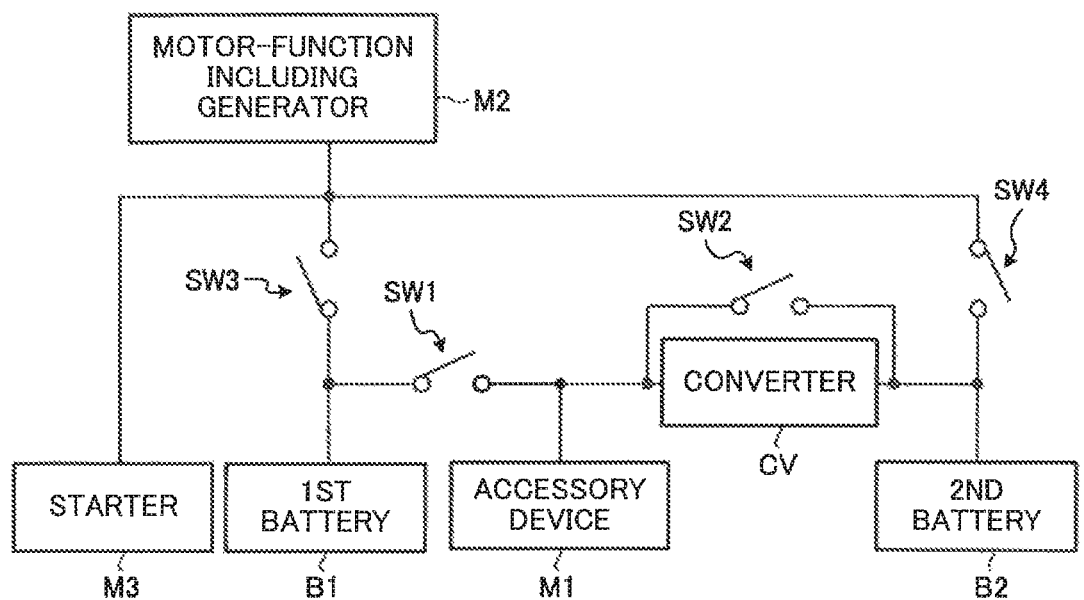
FIG. 3 illustrates the connected locations of the relays in a circuit of the embodiment.

The power supply control apparatus 1 includes a controller 10, a memory 20, the first relay SW1, the second relay SW2, a third relay SW3 and a fourth relay SW4. Here described will be connected locations of the first relay SW1, the second relay SW2, the third relay SW3 and the fourth relay SW4 in a circuit of the power supply control system 100, with reference to FIG. 3. FIG. 3 illustrates the connected locations of the relays in the circuit of this embodiment.

As shown in FIG. 3, one end of the first relay SW1 is connected to the first battery B1 and another end of the first relay SW1 is connected to the accessory device M1. The first battery B1 has a higher tolerance to an instantaneous large current discharge as compared to the second battery B2, and has a charge/discharge efficiency lower than the second battery B2. One example of the first battery B1 is a lead-acid battery. The accessory device M1 is a vehicle-mounted device that consumes power constantly or continuously for a relatively long time period. For example, the accessory device M1 is a car navigation apparatus, a television, a radio, an audio, an air conditioner, etc.

One end of the second relay SW2 is connected to the second battery B2 and another end of the second relay SW2 is connected the accessory device M1. The second battery B2 has a lower tolerance to the instantaneous large current discharge as compared to the first battery B1, and has the charge/discharge efficiency higher than the first battery B1. Examples of the second battery B2 are a lithium-ion battery, a capacitor, etc.

One end of the third relay SW3 is connected to the first battery B1, and another end of the third relay SW3 is connected to motor-function including generator M2 and to the starter M3. One end of the fourth relay SW4 is connected to the second battery B2 and another end is connected to the motor-function including generator M2 and the starter M3.

For example, when the vehicle is accelerated, the motor-function including generator M2 functions as a motor that assists the engine in motion, and while the vehicle is traveling at a constant speed or while the vehicle is in regenerative braking, the motor-function including generator M2 functions as a power generator that generates power by converting rotational energy of the engine to power. The starter M3 starts the engine by rotating the engine being stopped.

The first relay SW1, the second relay SW2, the third relay SW3 and the fourth relay SW4 are caused by a drive signal received from the controller 10, to be in the closed state from the open state and in the open state from the closed state.

With reference back to FIG. 2, the memory 20 is a semiconductor memory element, such as a random access memory (RAM) and a flash memory, or a storage apparatus, such as a hard disk drive (HDD) and an optical disk. The memory 20 stores power supply control information 21 that is used when the controller 10 performs the power supply control. An example of the power supply control information 21 will be described later with reference to FIG. 4.

The controller 10 includes a microcomputer having a central processing unit (CPU), a read only memory (ROM), a random access memory (RAM) and an input/output port, and circuits.

Then, the controller 10 includes a power supply controller 12 and a determiner 11 that functions by executing a diagnosis program stored in the ROM by the CPU using the RAM as a workspace. The determiner 11 and the power supply controller 12 may be partially or entirely configured with hardware, such as an application specific integrated circuit (ASIC) and a field programmable gate array (FPGA).

The determiner 11 determines a state of the vehicle based on: a charge amount (or state of charge) of the second battery B2 obtained from the second battery B2; the information received from the IG 31 and the ACC 32; and the detection results received from the brake sensor 33, the speed sensor 34 and the accelerator sensor 35.

For example, the determiner 11 determines whether or not the vehicle is in a first start state. The first starting state here is a state in which the engine of the vehicle is started for a first time after the vehicle has been parked. The determiner 11 determines, based on the information received from the starter switch 30, the IG 31 and the ACC 32, whether or not the vehicle is in the first start state. More specifically, in a case where the engine of the vehicle is manually started with no electricity to the accessories, the determiner 11 determines that the vehicle is in the first start state.

Moreover, the determiner 11 determines whether or not the vehicle is in a steady travelling state. The steady travelling state here is a state in which the vehicle is travelling at a steady travelling speed without assistance of a motor function of the motor-function including generator M2. The determiner 11 determines, based on the detection results received from the speed sensor 34 and the accelerator sensor 35, whether or not the vehicle is in the steady travelling state. More specifically, in a case where the vehicle is travelling at a constant speed with the accelerator pedal pressed with a constant amount, the determiner 11 determines that the vehicle is in the steady travelling state.

Moreover, the determiner 11 determines whether or not the vehicle is in a deceleration regenerative braking state. The deceleration regenerative braking state here is a state in which the vehicle is slowing down in the regenerative braking. The determiner 11 determines, based on the detection results received from the accelerator sensor 35, the speed sensor 34 and the brake sensor 33, whether or not the vehicle is in the deceleration regenerative braking state. More specifically, in a case where the accelerator pedal is not pressed and a brake is applied so that the travelling speed of the vehicle decreases, the determiner 11 determines that the vehicle is in the deceleration regenerative braking state.

Moreover, the determiner 11 determines whether or not the vehicle is in a motor assistance state. The motor assistance state here is a state in which the vehicle is travelling with assistance of the motor function of the motor-function including generator M2. In a case where an amount of pressing the accelerator pedal increases, the vehicle is caused to be in the motor assistance state. The determiner 11 determines, based on the detection results received from the accelerator sensor 35 and the speed sensor 34, whether or not the vehicle is in the motor assistance state. More specifically, in a case where a pressed amount of the accelerator pedal and the travelling speed of the vehicle increase, the determiner 11 determines that the vehicle is in the motor assistance state.

Moreover, the determiner 11 determines whether or not the vehicle is in an idle stop (hereinafter "IS") state. The IS state here is a state in which the engine of the vehicle is automatically stopped with electricity to the accessories. After the brake is applied and the vehicle is stopped, in a case where the brake is applied for a predetermined time period, the vehicle is caused to be in the IS state. The determiner 11 determines, based on the detection results received from the speed sensor 34 and the brake sensor 33, whether or not the vehicle is in the IS state. More specifically, in a case where the brake is being applied for the predetermined time period or more after the vehicle is stopped, the determiner 11 determines that the vehicle is in the IS state.

Moreover, the determiner 11 determines whether or not the vehicle is in a restart state. The restart state here is a state in which the engine of the vehicle is restarted from the IS state. In a case where a press on the brake is released in the IS state or in a case where the accelerator pedal is pressed in the IS state, the vehicle is caused to be in the restart state. The determiner 11 determines, based on the detection results received from the brake sensor 33 or the accelerator sensor 35 in the IS state, whether or not the vehicle is in the restart state. More specifically, in the case where the press on the brake is released in the IS state or in the case where the accelerator pedal is pressed in the IS state, the determiner 11 determines that the vehicle is in the restart state. Then, the determiner 11 outputs information indicative of the determined state of the vehicle, to the power supply controller 12.

Moreover, the determiner 11 determines, based on the determined state of the vehicle and the charge amount of the second battery B2 obtained from the second battery B2, whether or not a predetermined condition is satisfied. For example, in a case where the second battery B2 has enough power to drive the accessory device M1, the determiner 11 determines, based on the amount of charge in the second battery B2 obtained from the second battery B2, that the predetermined condition is satisfied, and outputs, to the power supply controller 12, information indicating that the predetermined condition is satisfied.

Moreover, in a case where the second battery B2 is being charged because the second battery B2 does not have enough power to drive the accessory device M1, the determiner 11, based on the charge amount of the second battery B2 obtained from the second battery B2, determines that the predetermined condition is satisfied, and outputs, to the power supply controller 12, the information indicating that the predetermined condition is satisfied.

Moreover, in a case where the engine of the vehicle is in the IS state, the determiner 11 determines that the predetermined condition is satisfied, and outputs, to the power supply controller 12, the information indicating that the predetermined condition is satisfied. Moreover, in a case where the determiner 11 determines that the predetermined condition is not satisfied, the determiner 11 outputs, to the power supply controller 12, information indicating that the predetermined condition is not satisfied.

The power supply controller 12 outputs the drive signals to the first relay SW1, the second relay SW2, the third relay SW3 and the fourth relay SW4 to perform the power supply control for the accessory device M1 and the like, based on the information received from the determiner 11 and the power supply control information 21 stored in the memory 20.

The power supply controller 12 performs a start control and a stop control for the engine of the vehicle as well as a working control of the converter CV based on the information received from the determiner 11 and the power supply control information 21 stored in the memory 20. Those controls are not illustrated in FIG. 2.

Here, with reference to FIG. 4, an example of the power supply control information 21 of this embodiment will be described below. FIG. 4 illustrates the example of the power supply control information 21 of this embodiment. As shown in FIG. 4, the power supply control information 21 is information indicative of controls for the engine, the first relay SW1, the second relay SW2, the third relay SW3, the fourth relay SW4, and the converter CV for each state of the vehicle and for each charge amount of the second battery B2.

With reference back to FIG. 2, the power supply controller 12 controls the engine, the first relay SW1, the second relay SW2, the third relay SW3, the fourth relay SW4 and the converter CV based on the information received from the determiner 11 and the power supply control information 21.

Figure 5:
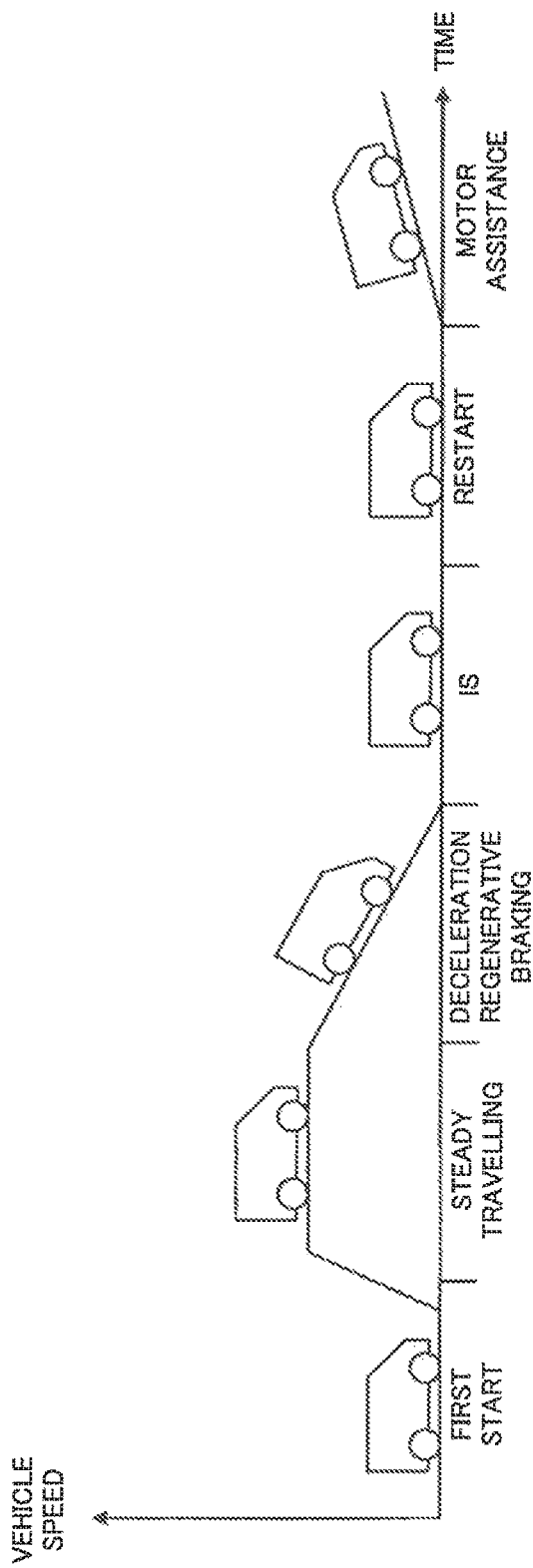
FIG. 5 illustrates an example of a change in states of a vehicle of the embodiment.

With reference to FIGS. 5 to 9A and 9B, next described will be an example of a power supply control performed by the power supply control apparatus 1 as the state of vehicle changes. FIG. 5 illustrates an example of a change in the states of the vehicle. Each of FIGS. 6A, 6B to 9A and 9B illustrates an example of the power supply control in the state of the vehicle of the embodiment.

In each of FIGS. 6A, 6B to 9A and 9B, a shaded portion of the second battery B2 indicates the charge amount of the second battery B2, and a thick arrow line and a thick broken arrow line indicate current flows. Moreover, in each of FIGS. 6A, 6B to 9A and 9B, the converter CV discharging or being charged is outlined with a thick line, and the converter CV being stopped is outlined with a narrow line.

Figure 6A:
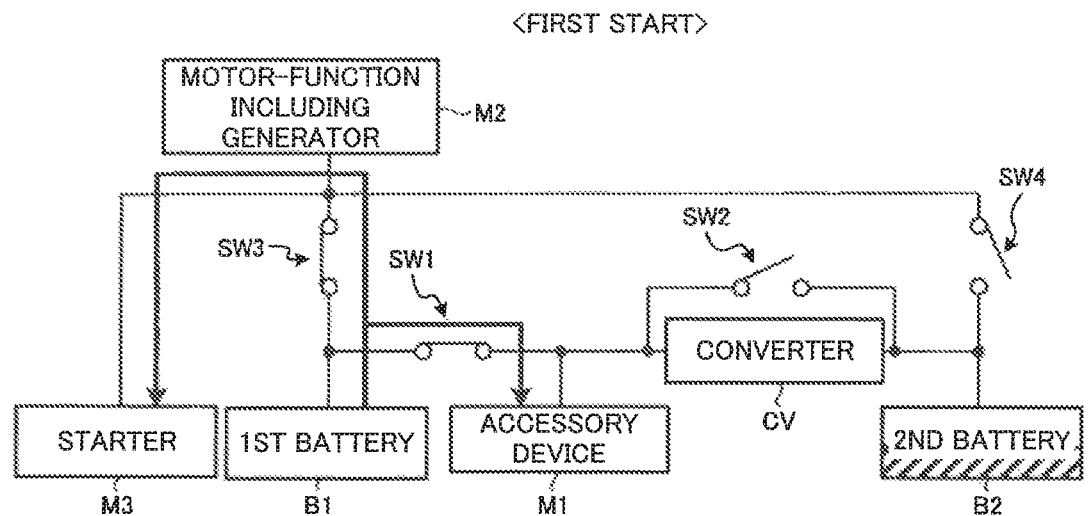
FIG. 6A illustrates an example of power supply control in one of the states of the vehicle of the embodiment.

As shown in FIG. 5, for example, in a case where the state of the vehicle is the first start state, the power supply controller 12 causes the first relay SW1 and the third relay SW3 to be in the closed state and the second relay SW2 and the fourth relay SW4 to be in the open state, as shown in FIG. 6A. Then, the power supply controller 12 stops the converter CV. Thus, the power supply control apparatus 1 supplies power to the starter M3 from the first battery B1 to start the engine, and supplies the power to the accessory device M1 from the first battery B1 to activate the accessory device M1.

Then, as shown in FIG. 5, for example, there is a case in which the state of the vehicle changes from the first start state to the steady travelling state. In the steady travelling state of the vehicle, the power supply controller 12 performs the power supply control that is different between a case in which the charge amount of the second battery B2 is relatively small and a case in which the charge amount of the second battery B2 is relatively large.

Figure 6B:
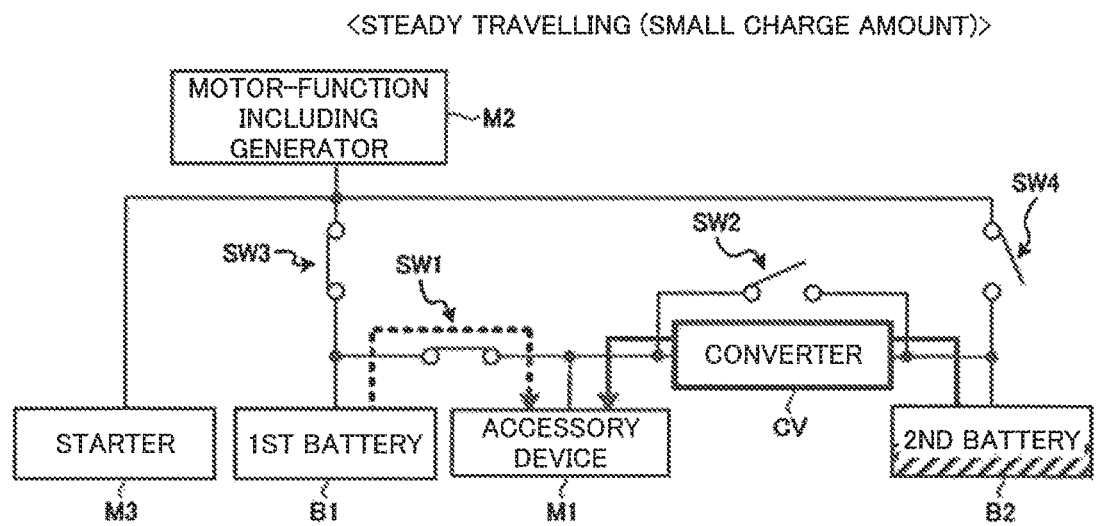
FIG. 6B illustrates an example of the power supply control in one of the states of the vehicle of the embodiment.

More specifically, in the case where the charge amount of the second battery B2 is relatively small, as shown in FIG. 6B, the power supply controller 12 keeps status quo of the open/closed states of the first relay SW1, the second relay SW2, the third relay SW3 and the fourth relay SW4. Then, the power supply controller 12 activates the converter CV (discharge operation).

Thus, the power supply control apparatus 1 supplies the power to the accessory device M1 from the second battery B2 via the converter CV. In other words, the power supply control apparatus 1 changes the power supply state to the foregoing first state. Thus, in the case where the charge amount of the second battery B2 is relatively small, the power supply control apparatus 1 causes the converter CV to boost an output voltage of the second battery B2 to supply the power to the accessory device M1, and causes the accessory device M1 to operate.

Moreover, even if the charge amount of the second battery B2 further decreases, since the first relay SW1 is in the closed state, the power supply control apparatus 1 supplies the power to the accessory device M1 from the first battery B1, keeping the accessory device M1 continuously operating.

Then, the second battery B2 is charged by, for example, the motor-function including generator M2 and there is a case where the charge amount of the second battery B2 becomes relatively large. In such a case, since the second battery B2 stores the power enough to drive the accessory device M1 in the first state, the power supply controller 12 receives, from the determiner 11, the information indicating that the predetermined condition is satisfied in the first state.

Figure 6C:
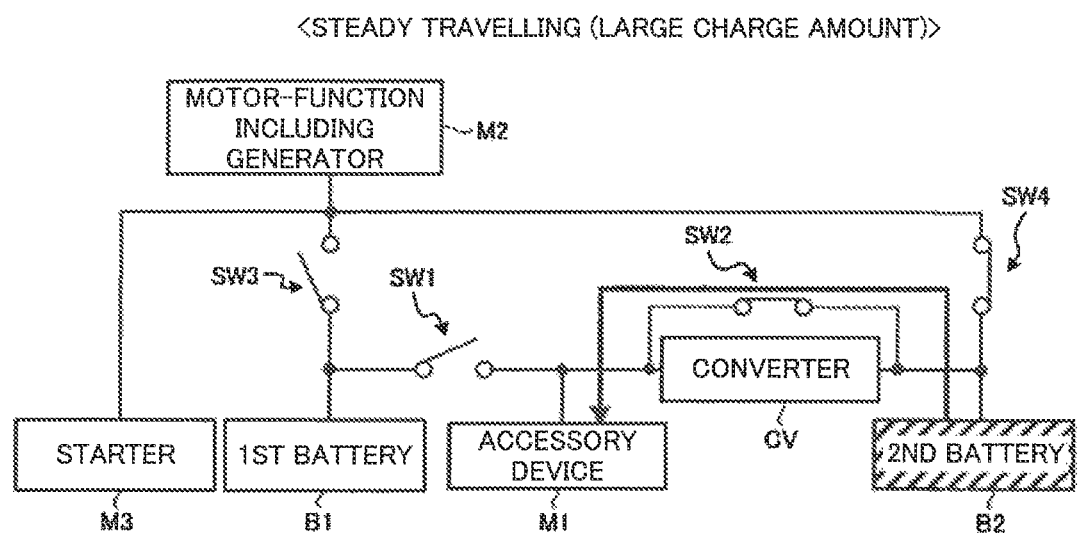
FIG. 6C illustrates an example of the power supply control in one of the states of the vehicle of the embodiment.

Therefore, the power supply controller 12 switches the power supply state from the first state to the second state, as shown in FIG. 6C. More specifically, the power supply controller 12 causes the first relay SW1 to be in the open state and the second relay SW2 to be in the closed state, and then stops the converter CV. Further, the power supply controller 12 causes the third relay SW3 to be in the open state and the fourth relay SW4 to be in the closed state.

Thus, the power supply control apparatus 1 supplies the power to the accessory device M1 directly from the second battery B2 not via the converter CV. In other words, the power supply control apparatus 1 changes the power supply state from the foregoing first state and the second state. Thus, even if the power consumption of the accessory device M1 exceeds the maximum output power of the converter CV, the power supply control apparatus 1 is configured to keep the accessory device M1 to operating by directly supplied power from the second battery B2 to the accessory device M1, not via the converter CV.

Moreover, since the first relay SW1 is in the open state, the power supply control apparatus 1 can completely disconnect the power supply by the first battery B1 from the accessory device M1. Therefore, the power supply control apparatus 1 can curb deterioration of the first battery B1 from excessive power charge/discharge.

Moreover, when the second battery B2 does not store power enough to drive the accessory device M1 in the second state (state shown in FIG. 6C), the power supply controller 12 receives, from the determiner 11, the information indicating that the predetermine condition is not satisfied. Thus, the power supply controller 12 switches the power supply state from the second state to the first state (state shown in FIG. 6B). Since the power is supplied from the first battery B1 to the accessory device M1, the power supply control apparatus 1 can keep the accessory device M1 operating.

After that, as shown in FIG. 5, there is a case where, for example, the state of the vehicle changes from the steady travelling state to the deceleration regenerative braking state. The power supply controller 12 performs, in the deceleration regenerative braking state, the power supply control that is different between the case in which the charge amount of the second battery B2 is relatively small and the case in which the charge amount of the second battery B2 is relatively large.

Figure 7A:
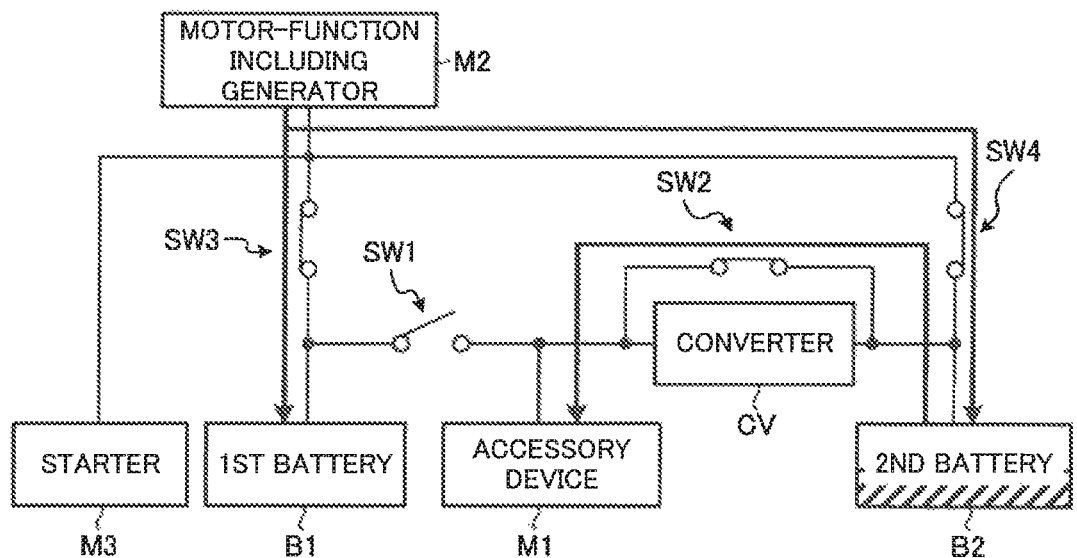
FIG. 7A illustrates an example of the power supply control in one of the states of the vehicle of the embodiment.

More specifically, in the case where the charge amount of the second battery B2 is relatively small, the power supply controller 12 causes the first relay SW1 to be in the open state, as shown in FIG. 7A, and the second relay SW2, the third relay SW3 and the fourth relay SW4 to be in the closed state. Then, the power supply controller 12 stops the converter CV.

Thus, the power supply control apparatus 1 supplies the power generated by the motor-function including generator M2 to the first battery B1 and the second battery B2, and charges the first battery B1 and the second battery B2. Here, the second battery B2 has the charge/discharge efficiency higher than the first battery B1.

Therefore, in the case where the charge amount of the second battery B2 is relatively small, the power supply control apparatus 1 is configured to change the power supply state to the second state, and to directly supply power to the accessory device M1 from the motor-function including generator M2 via the second battery B2, not via the converter CV.

Thus, even if the consumption power of the accessory device M1 exceeds the maximum output power of the converter CV, the power supply control apparatus 1 is configured to keep the accessory device M1 operating with the power directly supplied to the accessory device M1 from the second battery B2, not via the converter CV.

Besides, since the first relay SW1 is in the open state, the power supply control apparatus 1 completely disconnect the power supply by the first battery B1 from the accessory device M1. Therefore, the power supply control apparatus 1 can curb deterioration of the first battery B1 from excessive power charge/discharge.

Figure 7B:
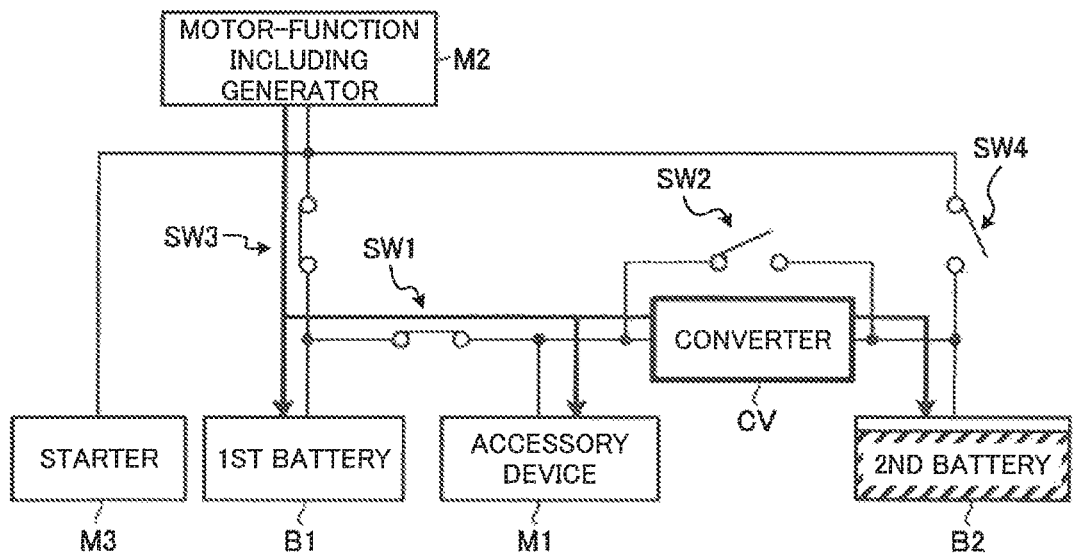
FIG. 7B illustrates an example of the power supply control in one of the states of the vehicle of the embodiment.

After that, there is a case in which the charge amount of the second battery B2 is relatively large because the motor-function including generator M2 keeps supplying power to the second battery B2. In such a case, as shown in FIG. 7B, keeping the third relay SW3 in the closed state, the power supply controller 12 causes the first relay SW1 to be in the closed state, and the second relay SW2 and the fourth relay SW4 to be in the open state, and then activates the converter CV (charge operation).

As described above, the power supply control apparatus 1 supplies the power generated by the motor-function including generator M2, to the first battery B1 and the second battery B2, and charges the first battery B1 and the second battery B2. At this time, the power supply control apparatus 1 supplies the power generated by the motor-function including generator M2 to the accessory device M1 to keep the accessory device M1 operating.

When the charge amount of the second battery B2 becomes relatively large, the power charge/discharge efficiency of the second battery B2 decreases. Thus, in the case where the charge amount of the second battery B2 is relatively large, the power supply control apparatus 1 supplies power to the second battery B2 from the motor-function including generator M2 via the converter CV, not via the fourth relay SW4. Thus, the power supply control apparatus 1 is configured to forcibly charge the second battery B2 by the charge operation of the converter CV in a decreased charge/discharge efficiency state.

After that, as shown in FIG. 5, for example, there is a case where the state of the vehicle changes from the deceleration regenerative braking state to the IS state. In a case of the IS state, the power supply controller 12 receives the information indicating that the determiner 11 has determined that the predetermined condition is satisfied. Thus, the power supply controller 12 changes the power supply state to the second state.

Figure 8A:
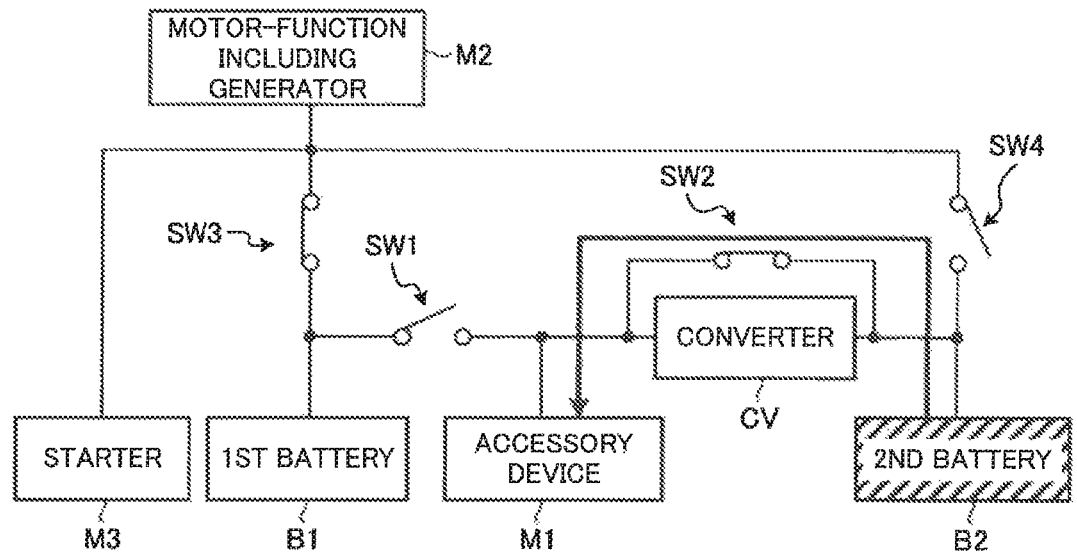
FIG. 8A illustrates an example of the power supply control in one of the states of the vehicle of the embodiment.

More specifically, as shown in FIG. 8A, the power supply controller 12 causes the first relay SW1 to be in the open state and the second relay SW2 to be in the closed state, and then stops the converter CV. In this time, the power supply controller 12 causes the third relay SW3 to be in the closed state and the fourth relay SW4 to be in the open state, in preparation for a later restart of the engine.

Thus, the power supply control apparatus 1 causes the second battery B2 to directly supply power to the accessory device M1, not via the converter CV. Thus, even if the consumption power of the accessory device M1 exceeds the maximum output power of the converter CV, the power supply control apparatus 1 is configured to cause the accessory device M1 to operate with the power directly supplied to the accessory device M1 from the second battery B2, not via the converter CV.

Further, since the first relay SW1 is in the open state, the power supply control apparatus 1 is configured to completely disconnect the power supply by the first battery B1 from the accessory device M1. Therefore, the power supply control apparatus 1 can curb deterioration of the first battery B1 from excessive charge/discharge of power.

Figure 8B:
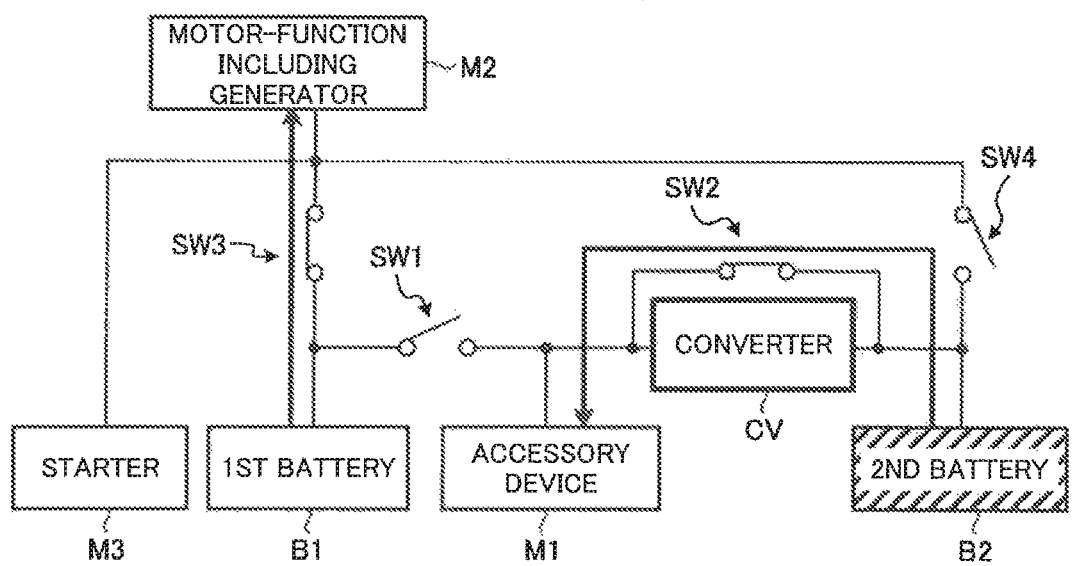
FIG. 8B illustrates an example of the power supply control in one of the states of the vehicle of the embodiment.

After that, as shown in FIG. 5, for example, the state of the vehicle changes from the IS state to the restart state. In a case where the engine of the vehicle in the IS state is restarted, with the power supply in the second state, as shown in FIG. 8B, the power supply control apparatus 1 supplies power to the motor-function including generator M2 from the first battery B1, and causes the engine to rotate by the motor-function including generator M2 to restart the engine.

In a case where a general alternator (generator) including no motor function, the power supply control apparatus 1 supplies the power to the starter M3 from the first battery B1 to rotate the engine by the starter M3 and to restart the engine in the IS state.

As described above, the first battery B1 has the higher tolerance to an instantaneous large current discharge, as compared to the second battery B2. Therefore, the first battery B1 is less deteriorated even if the engine is repeatedly restarted with the instantaneous large current discharge.

At this time, since the fourth relay SW4 is in the open state, when the engine is restarted, the power supply control apparatus 1 is configured to disconnect, from the motor-function including generator M2 or the starter M3, the power supply by the second battery B2 having a lower tolerance to the instantaneous large current discharge, as compared to the first battery B1. Thus, the power supply control apparatus 1 can curb deterioration of the second battery B2 from the instantaneous large current discharge.

Then, as shown in FIG. 5, for example, there is a case where the state of the vehicle changes from the restart state to the motor assistance state. The power supply controller 12 performs, in the motor assistance state, the power supply control that is different between the case in which the charge amount of the second battery B2 is relatively small and the case in which the charge amount of the second battery B2 is relatively large.

More specifically, in the case where the charge amount of the second battery B2 is relatively large, the power supply controller 12 causes the first relay SW1 and the fourth relay SW4 to be in the closed state, and the second relay SW2 and the third relay SW3 to be in the open state, as shown in FIG. 9. Then, the power supply controller 12 activates the converter CV (discharge operation).

As described above, the power supply control apparatus 1 supplies the power from the second battery B2 to the motor-function including generator M2, and assists the engine to work by the motor function of the motor-function including generator M2. Then, in the case where the charge amount of the second battery B2 is relatively large, the power supply control apparatus 1 keeps the accessory device M1 operating in the motor assistance state, by supplying the power to the accessory device M1 from the second battery B2 via the converter CV.

Figure 9A:
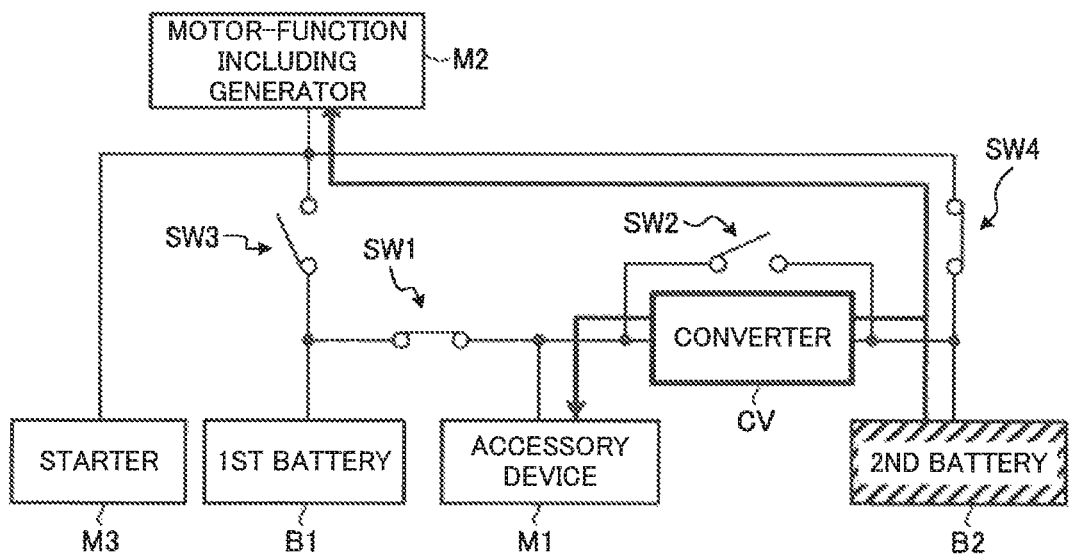
FIG. 9A illustrates an example of the power supply control in one of the states of the vehicle of the embodiment.
Figure 9B:
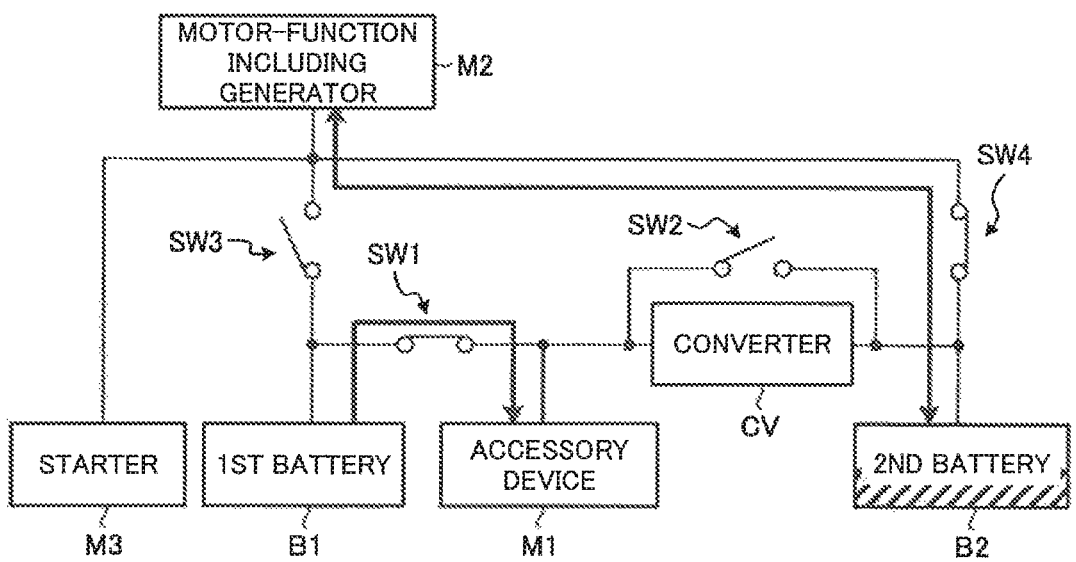
FIG. 9B illustrates an example of the power supply control in one of the states of the vehicle of the embodiment.

Then, in the case where the charge amount of the second battery B2 becomes relatively small in the motor assistance state, the power supply controller 12 stops the converter CV, as shown in FIG. 9B. Thus, the power supply control apparatus 1 disconnects the power supply by the second battery B2 from the accessory device M1, and supplies the power to the accessory device M1 from the first battery B1.

As described above, the power supply control apparatus of this embodiment switches the power supply state from the first state in which the power is supplied to the accessory device via the power converter, from the second battery having the charge/discharge power efficiency higher than the first battery connected to the accessory device, to the second state in which the first battery is disconnected from the accessory device to switch the power supply state from the first state to a second power supply state. Thus, the power supply control apparatus 1 can curb deterioration of the battery.

A circuit in FIG. 3 is an example. Various modifications are possible if the circuit is switchable from the foregoing first state of the power supply state of the accessory device to the second state and vice versa.

Figure 10A:
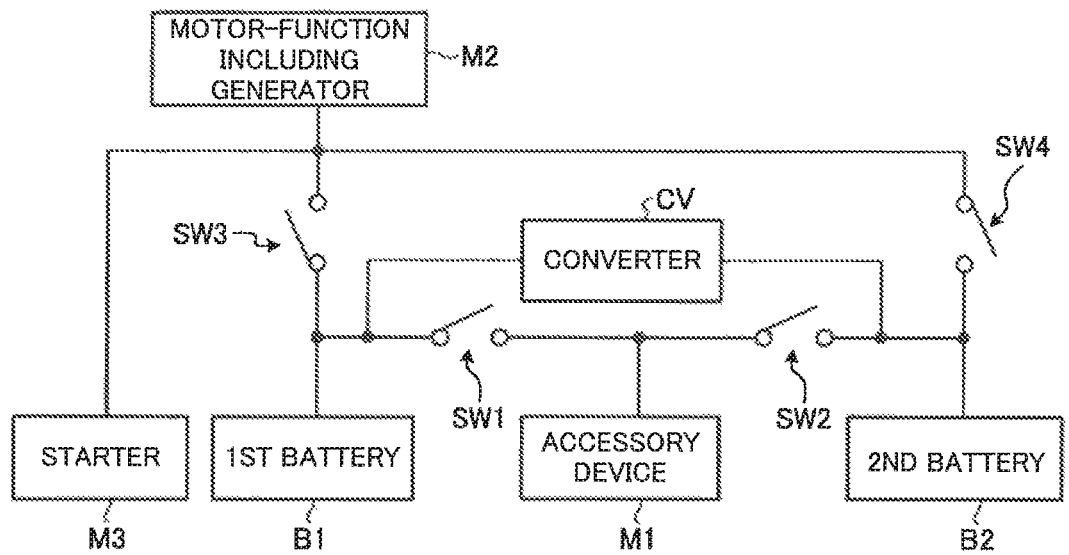
FIG. 10A illustrates an example of a circuit configuration of a modification.
Figure 10B:
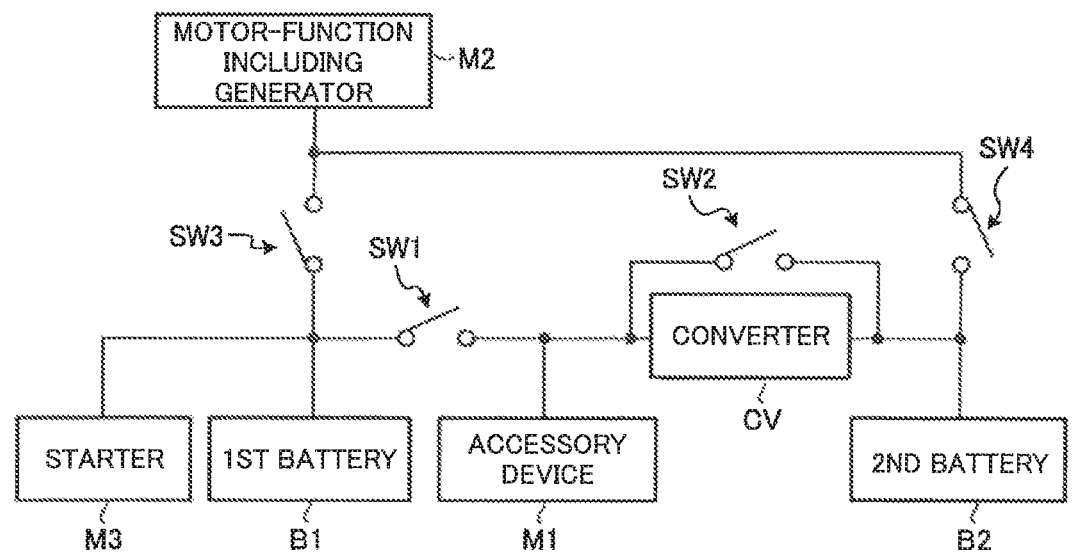
FIG. 10B illustrates an example of a circuit configuration of the modification.

Next described will be a modification example of the circuit configuration of this embodiment with reference to FIGS. 10A and 10B. Each of FIGS. 10A and 10B illustrates the modification example of the circuit configuration of this embodiment. Here, among elements in FIGS. 10A and 10B, elements having same functions as the elements shown in FIG. 3 are given with same reference numerals in FIG. 3.

The circuit shown in FIG. 3 may be a circuit shown in FIG. 10A. In the circuit of a modification 1 in FIG. 10A, one end of a converter CV is connected to a first battery B1 instead of an accessory device M1, which is different from the circuit in FIG. 3.

In a case of the circuit of the modification 1, a power supply controller 12 causes a first relay SW1 to be in a closed state, and a second relay SW2 to be in an open state. Thus, the power can be supplied to the accessory device M1 from a second battery B2 via the converter CV, and the power can be supplied to the accessory device M1 from the first battery B1. In other words, the power supply controller 12 is configured to cause the power supply state for the accessory device M1 to be the first state.

Moreover, in the case of the circuit of the modification 1, the power supply controller 12 causes the first relay SW1 to be in the open state and the second relay SW2 to be in the closed state. Thus, the accessory device M1 is disconnected from the power supply by the first battery B1, and the power can be supplied to the accessory device M1 from the second battery B2, not via the converter CV. In other words, the power supply controller 12 changes the power supply state for the accessory device M1 to the second state. Thus, in a case where a circuit shown in FIG. 10A is used, instead of the circuit shown in FIG. 3, the power supply control apparatus 1 can produce a same effect produced in the aforementioned embodiment.

Moreover, in the case of the circuit of the embodiment 1, the power supply controller 12 can cause the first relay SW1 and the second relay SW2 to be in the closed state. Thus, the power supply control apparatus 1 can supply power to the first battery B1 from the second battery B2 via the converter CV to charge the first battery B1 while directly supplying power to the accessory device M1 from the second battery B2 not via the converter CV.

Moreover, the circuit shown in FIG. 3 may be a circuit shown in FIG. 10B. The circuit of a modification 2 in FIG. 10B is different from the circuit shown in FIG. 3 on a point that a starter M3, instead of the motor-function including generator M2, is connected to the first battery B1.

In a case of the circuit of the modification 2, the power supply controller 12 causes the first relay SW1 to be in the closed state and the second relay SW2 to be in the open state. Thus, the power can be supplied to the accessory device M1 from the second battery B2 via the converter CV, and power can be supplied to the accessory device M1 also from the first battery B1. In other words, the power supply controller 12 can change the power supply state for the accessory device M1 to the first state.

Moreover, in the case of the circuit of the modification 2, the power supply controller 12 causes the first relay SW1 to be in the open state and the second relay SW2 to be in the closed state. Thus, the accessory device M1 is disconnected from the power supply by the first battery B1, and the power can be supplied to the accessory device M1 from the second battery B2 not via the converter CV. In other words, the power supply controller 12 can change the power supply state for the accessory device M1 to the second state. Thus, in a case where the circuit shown in FIG. 10B is used, instead of the circuit shown in FIG. 3, the power supply control apparatus 1 can produce a similar effect produced in the foregoing embodiment.

Moreover, in the case of the circuit of the modification 2, the power supply control apparatus 1 can directly supply power to the starter M3 from the first battery B1 to drive the starter M3, without switching the third relay SW3 from the open state to the closed state. Thus, the power supply control apparatus 1 can simplify a control of the switch.

More effects and modifications of the embodiment can be easily derived by a person skilled in the art. Thus, broader aspects of the invention are not limited to the specific details and the representative embodiment described above. Therefore, various modifications are possible without departing from the comprehensive concept and spirit of the invention defined in the attached claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A power supply control apparatus that controls supply of power to an accessory device connected to a first battery, the power supply control apparatus comprising:
    a power supply controller that switches a power supply state from a first state to a second state, the first state being a state in which power is supplied to the accessory device via a power converter from a second battery that has a charge/discharge efficiency higher than the first battery, the second state being a state in which the power is supplied from the second battery to the accessory device not via the power converter, with the first battery disconnected from the accessory device, wherein
    the power supply controller switches the power supply state from the first state to the second state during a steady travelling state of a vehicle on which the accessory device is mounted, the steady travelling state being a state in which an engine of the vehicle is running.

2. The power supply control apparatus according to claim 1, further comprising:
    a processor that determines whether or not a predetermined condition is satisfied while the power supply state is in the first state, wherein
    in a case where the processor has determined that the predetermined condition is satisfied while the power supply state is in the first state, the power supply controller switches the power supply state from the first state to the second state.

3. The power supply control apparatus according to claim 2, wherein
    the processor determines whether or not the predetermined condition is satisfied while the power supply state is in the second state, and
    in a case where the processor has determined that the predetermined condition is not satisfied while the power supply state is in the second state, the power supply controller switches the power supply state from the second state to the first state.

4. The power supply control apparatus according to claim 3, wherein
    the processor determines that the predetermined condition is satisfied when the second battery has enough power to drive the accessory device.

5. The power supply control apparatus according to claim 2, wherein
    when the second battery does not have enough power to drive the accessory device but the second battery is being charged, the power supply controller causes power for the second battery to be directly output to the accessory device.

6. The power supply control apparatus according to claim 2, wherein
    the processor determines that the predetermined condition is satisfied when the engine of the vehicle on which the accessory device is mounted is in an idle stop state.

7. The power supply control apparatus according to claim 6, wherein
    when the first battery has a higher tolerance to an instantaneous large current discharge as compared to the second battery, the power supply controller causes the power to be supplied to a starter for the engine from the first battery in the second state to restart the engine in the idle stop state.

8. The power supply control apparatus according to claim 1, further comprising:
    a first relay that is connected in series between the first battery and the accessory device; and
    a second relay that is connected in parallel to the power converter that is connected in series between the accessory device and the second battery, wherein
    the power supply controller causes the first relay to be in an open state from a closed state, and causes the second relay to be in the closed state from the open state to switch the power supply state from the first state to the second state.

9. The power supply control apparatus according to claim 8, wherein
    the power supply controller causes the first relay to be in the closed state from the open state, and causes the second relay to be in the open stated from the closed state to switch the power supply state from the second state to the first state.

10. The power supply control apparatus according to claim 1, wherein
    the power supply controller also controls the supply of power from the first battery to a starter that drives the engine of the vehicle on which the accessory device is mounted, the starter being different from the accessory device.

11. A power supply control system that controls supply of power to an accessory device connected to a first battery, the power supply control system comprising:
    a second battery that has a charge/discharge efficiency higher than the first battery; and
    a power supply controller that switches a power supply state from a first state to a second state, the first state being a state in which power is supplied to the accessory device from the second battery via a power converter, the second state being a state in which the power is supplied from the second battery to the accessory device not via the power converter, with the first battery disconnected from the accessory device, wherein
    the power supply controller switches the power supply state from the first state to the second state during a steady travelling state of a vehicle on which the accessory device is mounted, the steady travelling state being a state in which an engine of the vehicle is running.

12. The power supply control system according to claim 11, wherein
the power supply controller also controls the supply of power from the first battery to a starter that drives the engine of the vehicle on which the accessory device is mounted, the starter being different from the accessory device.

* * * * *